US007837550B2

(12) United States Patent
Odom

(10) Patent No.: US 7,837,550 B2
(45) Date of Patent: Nov. 23, 2010

(54) METHOD AND DEVICE FOR CONDUCTING A GAME OF CHANCE

(75) Inventor: Wayne Odom, Tucson, AZ (US)

(73) Assignee: Karaway Gaming, Inc., Tucson, AZ (US)

( * ) Notice: Subject to any disclaimer, the term of this patent is extended or adjusted under 35 U.S.C. 154(b) by 1161 days.

(21) Appl. No.: 11/282,332

(22) Filed: Nov. 19, 2005

(65) Prior Publication Data

US 2006/0121976 A1 Jun. 8, 2006

Related U.S. Application Data

(63) Continuation-in-part of application No. 10/443,567, filed on May 22, 2003, now Pat. No. 7,316,612, which is a continuation-in-part of application No. 09/557, 948, filed on Apr. 24, 2000, now Pat. No. 6,581,935.

(30) Foreign Application Priority Data

May 19, 2003 (WO) .................... PCT/US03/15670

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |
| ***A63B 57/00*** | (2006.01) |
| ***A63B 69/36*** | (2006.01) |

(52) U.S. Cl. ............................ 463/19; 463/20; 463/30; 473/131

(58) Field of Classification Search .................. 463/19, 463/23, 30; 473/131
See application file for complete search history.

(56) References Cited

U.S. PATENT DOCUMENTS

| | | | | |
|---|---|---|---|---|
| 5,647,798 | A * | 7/1997 | Falciglia | 463/19 |
| 6,656,044 | B1 * | 12/2003 | Lewis | 463/19 |
| 2002/0113369 | A1 * | 8/2002 | Weingardt | 273/269 |

* cited by examiner

*Primary Examiner*—John M Hotaling, II
*Assistant Examiner*—Adetokunbo Torimiro
(74) *Attorney, Agent, or Firm*—Robert Ryan Morishita; Morishita Law Firm LLC

(57) ABSTRACT

One or more player Bingo cards are generated using a universe of Bingo indicia, optionally with player input. In an optional embodiment, the player may select all or a portion of the Bingo indicia on a player Bingo card, or regenerate a player Bingo card. A selection set of pairs are generated, each pair consisting of a Bingo indicium and a playing card. The pairs of the selection set are compared to the player Bingo cards and, on each player Bingo card, locations matching the Bingo indicium of a pair are replaced with the corresponding playing card of the pair. The player is rewarded if a pattern on the player Bingo card matches a winning Bingo pattern. The player is also rewarded for having a poker hand formed from the playing cards along predetermined poker patters on the player Bingo card match a winning poker hand.

12 Claims, 7 Drawing Sheets

290

291

| Bingo Indicium | Playing Card |
|---|---|
| N 32 | 6♡ |
| I 18 | K♤ |
| I 26 | 10♢ |
| N 42 | 3♡ |
| O 64 | J♤ |
| N 40 | 4♧ |
| B 5 | Q♢ |
| B 11 | K♧ |
| G 52 | A♧ |
| I 27 | 9♢ |
| B 15 | Q♡ |
| G 51 | 3♧ |
| O 73 | J♡ |
| B 2 | 6♤ |
| I 22 | A♢ |
| G 58 | 5♤ |

FIG. 2D

METHOD AND DEVICE FOR CONDUCTING A GAME OF CHANCE

RELATED APPLICATION DATA

This application is a continuation-in-part of U.S. patent application Ser. No. 10/443,567, entitled "Electronic Bingo Game and Method," filed May 22, 2003 now U.S Pat. No. 7,316,612 by Applicant herein, which, in turn, was a continuation-in-part of U.S. patent application Ser. No. 09/557,948, now U.S. Pat. No. 6,581,935, entitled "Electronic Bingo Game and Method," filed Apr. 24, 2000 by Applicant herein. This application also claims priority to PCT Application No. PCT/US03/15670 with a priority date of May 19, 2003 filed by Applicant herein.

FIELD OF THE INVENTION

The present invention relates to games of chance. More specifically, the present invention relates to methods and devices for conducting games in which a player utilizes a Bingo format to play a game combining the rules and rewards of Bingo and video poker.

BACKGROUND OF THE INVENTION

Poker games are well known in the casino industry. There are many different types of poker games, including stud poker, in which the player plays the hand dealt, and draw poker, in which the player has the opportunity to discard and replace cards in the player's hand. These games, and many other variations thereon, have been embodied in video gaming machines. For example, in the case of draw poker, the video poker machine or a central server selects the playing cards to be dealt to the player from a data structure storing data representing a deck of playing cards and displays the player's initial hand at a display.

The player selects the playing cards to "hold," and the remaining playing cards from the player's initial hand are discarded and replaced from the deck of playing cards depleted of the cards already dealt. The replacements along with the held cards form a final hand.

The player's final hand is compared to a pay schedule which determines winning combinations and associated awards. Typically, these combinations represent the conventional ranked Poker hands such as a pair of Jacks or better, two pair, three of a kind, and so forth. If the player's final outcome matches a winning combination, the player is rewarded with the associated award. Otherwise, the final outcome is deemed to be a loss and the player's wager is retained by the gaming machine.

With the increasing popularity of video poker, there is a parallel demand for innovations and variations to attract new players and to keep existing players excited. Multi-hand and multi-wager games abound as do games with variations in pay tables and game strategies, such as joker and wild card games and games which skew pay tables away from pure probabilities.

Bingo games are likewise well known in the casino industry. In such games a player has a game "card" having a random distribution of numeric indicia, and the game operator conducts a lottery like selection of such indicia. As indicia values are selected, they are marked on the player card until a given pattern of selected locations emerges. The first player to achieve a desired pattern thereby wins the Bingo game.

Bingo is a highly mechanical game, with the requisite skill of marking selected indicia on a player's Bingo cards being a skill readily learned over time. Serious Bingo players often simultaneously manage dozens of cards, and managing of over a hundred cards is not unusual for the truly expert player, even in a non-automated environment. The very trait which makes it less attractive to a serious gambler, i.e. the absence of an analytical skill requirement, makes it attractive to the Bingo afficionado, who can derive the excitement of playing a high number of Bingo cards without the strain and effort typically associated with high stakes gambling.

Bingo, however, is typically a player-banked game, with the player wagers funding the prize pool. In casino operations, there is a desire to play house-banked games, or hybrid house-and-player-banked games, in which the player is playing at least partially against the casino, rather than simply against other players. Bingo is not conducive to such play, as a typical Bingo game will always yield a winner.

There is thereby a need in the art for a game which combines the house-banked nature of a video poker game with the ease of play and automation of a Bingo game. Such a game may allow for simultaneous play of multiple "cards" like Bingo, yet pay according to defined pay tables like video poker. In its automated implementation, simultaneous play of a hundred or more hands is feasible for players at all experience levels, and it is also reasonable to allow players the choice of either selection of the indicia with which to populate their cards, or allowing the game processor to do so in their stead.

SUMMARY OF THE INVENTION

A method for conducting a game of chance for one or more players uses playing cards, optionally a standard deck of fifty-two playing cards, a universe of Bingo indicia, optionally standard Bingo numbers one through seventy-five, inclusive. The method also includes a Bingo card forming a matrix of coordinate locations. Optionally, a conventional Bingo card template in the form of a 5×5 matrix in which columns identified "B," "I," "N," "G," and "O" is used. In a further optional embodiment, at least one of the coordinate locations may be designated a "free" space that is considered a match in any pattern including the "free" space.

The method also includes defining a Bingo pay table identifying one or more winning Bingo patterns of coordinate locations and one or more associated Bingo awards and defining a poker pay table identifying one or more winning poker hands of playing cards and one or more associated poker awards. Optionally, the winning Bingo patterns of coordinate locations include conventional Bingo patterns such as one or more columns of coordinate locations, one or more rows of coordinate locations, one or more diagonals of coordinate locations, and/or the four corners of coordinate locations. Optionally, the poker pay table includes conventional poker hands such as royal flush, five of a kind, straight flush, four of a kind, full house, flush, straight, three of a kind, two pair, and/or pair of kings or higher.

Each player places a game wager to play at least one Bingo card. Optionally, a player may be allowed to play multiple Bingo cards. In such an optional embodiment, the player may be allowed to specify the quantity of Bingo cards to generate but may also be required to place a proportionally larger wager.

At least one player Bingo card is generated by selecting Bingo indicia from the universe of Bingo indicia and placing the selected Bingo indicia in the coordinate locations. In an embodiment in which the player may specify the quantity of player Bingo cards, the quantity of player Bingo cards specified is generated. In one optional embodiment, the player may permitted to manually generate at least a portion of at least one player Bingo card by selecting the Bingo indicia displayed in the coordinate locations of the player Bingo card. In yet another optional embodiment, the player may be allowed the option of regenerating a player Bingo card. In such an optional embodiment, if the player opts to regenerate the player Bingo card, the Bingo indicia displayed in the matrix of coordinate locations are re-selected.

A selection set of pairs are generated. Each pair includes a Bingo indicium selected from the universe of Bingo indicia and a playing card selected from the deck of playing cards. In an optional embodiment, each pair of the selection set includes a randomly selected Bingo indicium and a randomly selected playing card, wherein the Bingo indicium and the playing card are separately and independently selected. In a further optional embodiment in which the selection set is randomly selected based on a random number generator using a selected seed, the player may be allowed to prompt the re-selection of the seed.

The Bingo indicium of each pair is compared to the player Bingo card. If the Bingo indicium of a pair matches a Bingo indicium on the player Bingo card, the coordinate location of the matching Bingo indicium is identified and the playing card of the pair is positioned at the coordinate location of the matching Bingo indicium.

If the coordinate locations of the matching Bingo indicia form one of the winning Bingo pattern of coordinate locations, the Bingo award associated with that winning Bingo pattern is awarded to the player. Similarly, if the playing cards positioned along a predetermined poker pattern of coordinate locations form one of the winning poker hand of playing cards, the poker award associated with that winning poker hand is awarded to the player. Optionally, only the highest ranking poker hand on each player Bingo card is rewarded, along with any winning Bingo pattern. Optionally, where the winning poker hands include a five-card straight, the Bingo award and the poker award may be increased, such as doubled, if the player has a winning Bingo pattern and a poker hand of at least a five-card straight.

The present invention also includes a device for carrying out the present method. Such a device could include a data processor, as well as a display, a device receiving wagers and issuing awards, and a data structure all communicating with the data structure. In an optional embodiment, the device may also include an input device. The data structure stores electronic representations of playing cards, a universe of Bingo indicia, a template for Bingo cards, a Bingo pay table identifying one or more winning Bingo patterns of coordinate locations and one or more associated Bingo awards, a poker pay table identifying one or more winning poker hands of playing cards and one or more associated poker awards, and instructions executable by the processor for conducting the method described above.

BRIEF DESCRIPTION OF THE DRAWINGS

FIG. 2D is an illustration of a set of relevant random selection values;

DESCRIPTION

Figure 1:
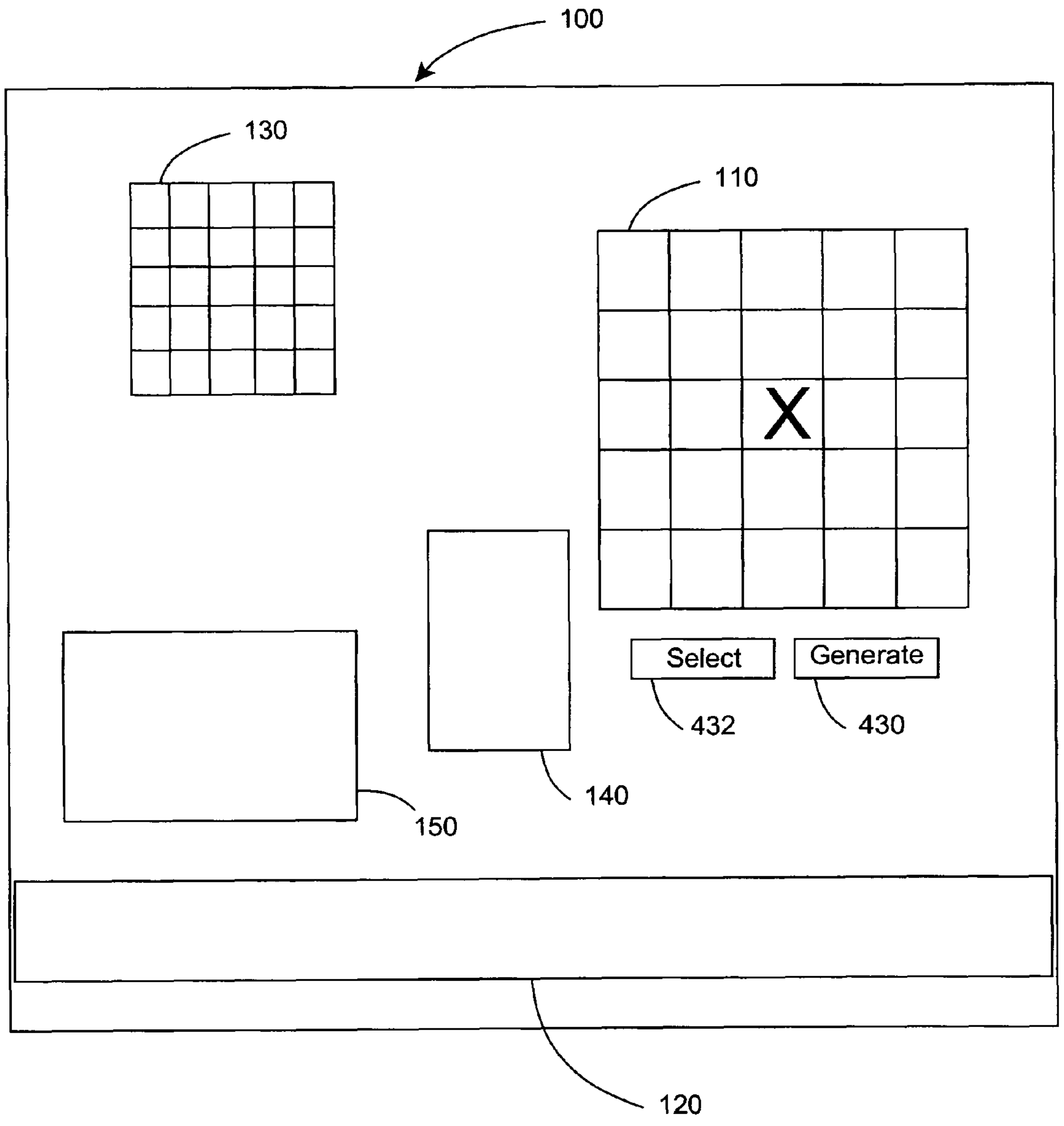
FIG. 1 is an illustration of an embodiment of the game display.
Figure 4:
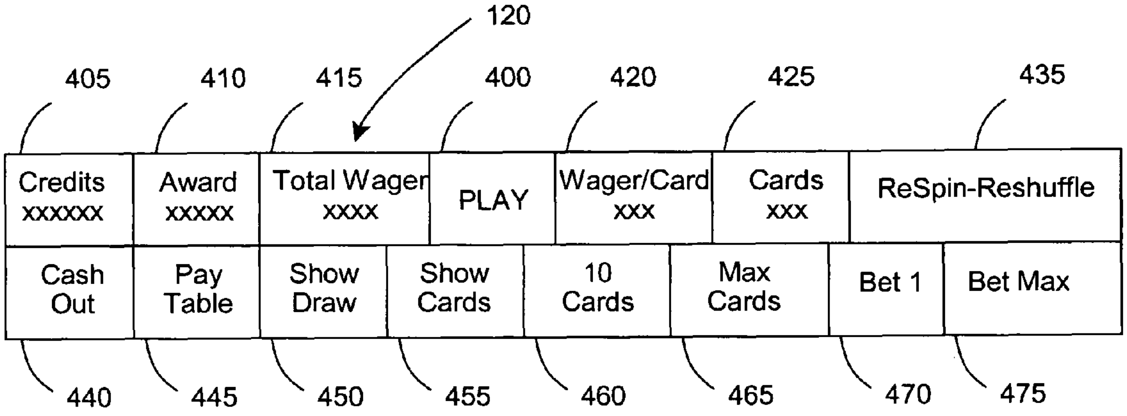
FIG. 4 is an illustration of an embodiment of the control and status display.

Reference is now made to the figures wherein like parts are referred to by like numerals throughout. Referring to FIG. 1, in an optional embodiment, a device according to the present invention uses a display 100. In an optional embodiment including an input device, the input device may be integrated into the display using touch-screen input, stylus input, or the like. In such an optional embodiment, the display may include a control and status section 120, a primary Bingo card display 110, a winning Bingo card display 130, a card selection display 140, and a message and instructions section 150. In the optional embodiment displayed, player input and control is administered through the control and status section 120, shown in detail in FIG. 4. In alternate optional embodiments, depressable control buttons may be employed or other types of player input devices and methods as are known in the art may be integrated.

In a novelty or entertainment embodiment, the player plays strictly for entertainment value and may input a fee or may play without fee, depending upon the implementation. In such an embodiment, the game may commence upon the player prompting his or her participation.

In a gaming embodiment, the player may place a wager prior to the start of play. In such an optional embodiment, the player could wager in many different ways, including inserting cash or scrip into the gaming device, or by allocating a wager from stored credits, a line of credit, an account, or the like. In this optional embodiment, the amount of available credit for play is displayed in a Credit display 405 in the control and status section 120 of the device display 100. In this optional embodiment, the player selects the desired total wager which may be displayed in a Wager display 415. Optionally, the total wager may be based upon the number of Bingo cards to be played (which may be displayed in a Cards display 425) and the wager per player Bingo card (which may be displayed in a Wager/Card display 420) and, in this respect, the total wager is proportional to the number of Bingo cards to be played. In an optional embodiment, the player may increase or decrease the number of Bingo cards to be played in groups, such as in groups of ten, although it is also contemplated that the number of Bingo cards to be played may, in another optional embodiment, be increased or decreased singly. In an optional embodiment, the wager is uniform across hands. In an alternate optional embodiment, the wager may vary from player Bingo card to player Bingo card. In yet another optional embodiment, the total wager and the number of player Bingo cards may be may be selected by the player, and the wager per player Bingo card computed.

In an optional embodiment, the operator, typically the casino, specifies the betting unit, the maximum wager per hand, and the maximum number of hands permitted to be played. Such values may be displayed to the player in the message and instructions section 150 of the display, or may be presented otherwise, such as in external signage, coded light displays as are known in the art (e.g., red lights for nickel machines, yellow for quarters, blue for half-dollars, white for dollars), or otherwise.

In the optional embodiment illustrated, the player may select the number of Bingo cards to be played in either of two methods. The player may actuate the 10 Cards control 460 for the first ten cards, or to add cards in increments of ten, until the desired number of cards is reached. Alternatively, the player who wishes to play the most cards allowed may simply actuate the Max Cards control 465 to go directly to this maximum as determined by the casino.

Similarly, in the optional embodiment illustrated, the player may select the wager per card by actuating the Bet 1 control 470 the number of times which corresponds to the desired wager per card, or actuating the Bet Max control 475 to wager the casino-determined maximum on each Bingo card. As the player selects the desired number of cards and the wager per card, the Wager display 415 is updated accordingly.

Once the player has selected the desired number of cards to be played, and the desired wager per card to be risked, the player may initiate play. In the optional embodiment illustrated, this is achieved by actuating the Play control 400.

In the optional embodiment illustrated, a data processor in the device generates the player Bingo cards as they are selected for play by the player, i.e. each time the player actuates the 10 Cards control 460 or the Max Cards control 465. While the player may be limited to the Bingo cards generated for the player by the data processor, in this optional embodiment, if the player wishes to change the player Bingo cards, the player actuates the Generate control 430 which causes the random regeneration of cards elected for play, as discussed in greater detail below.

Figure 2A:
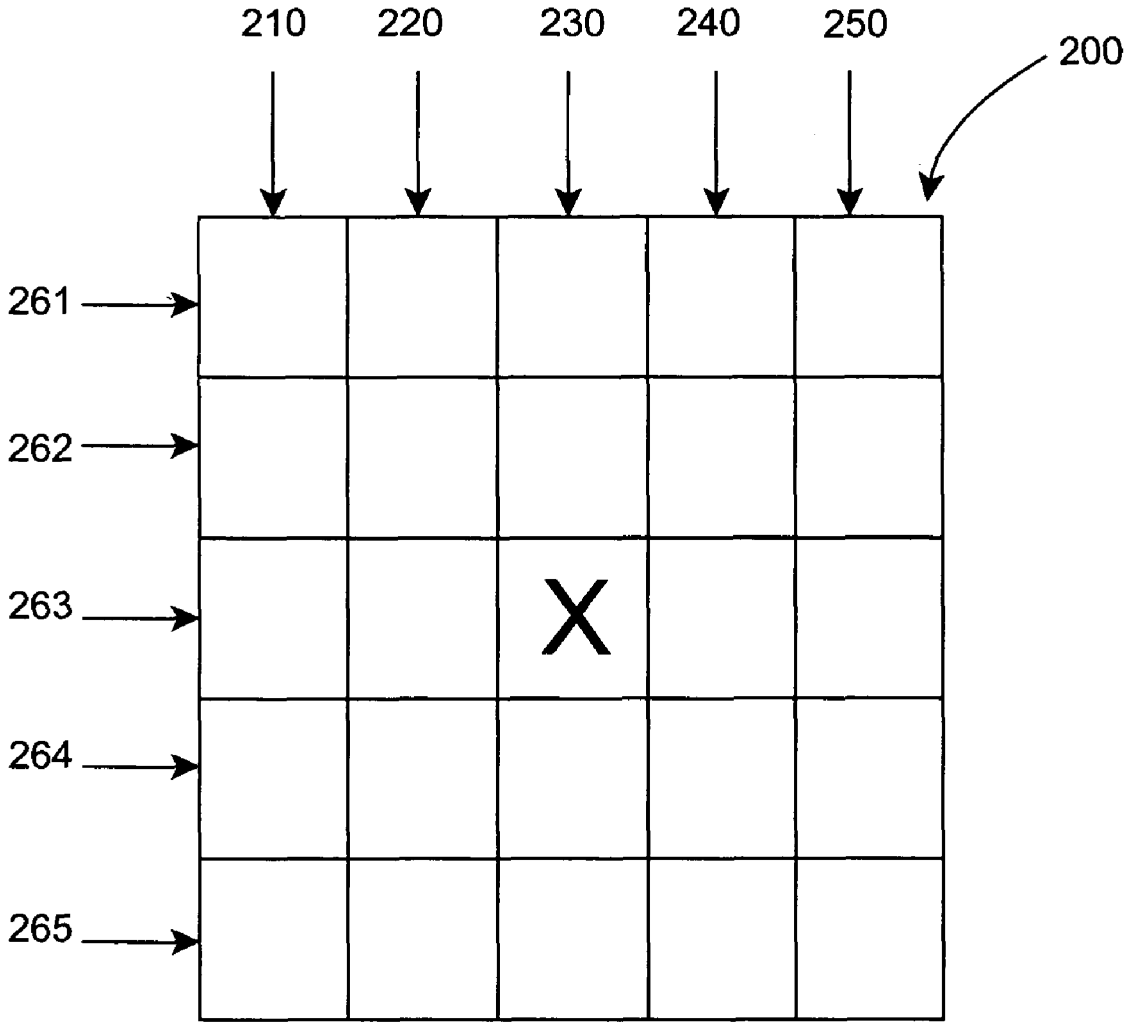
FIG. 2A is an illustration of a sample Bingo card before generation.
Figure 2B:
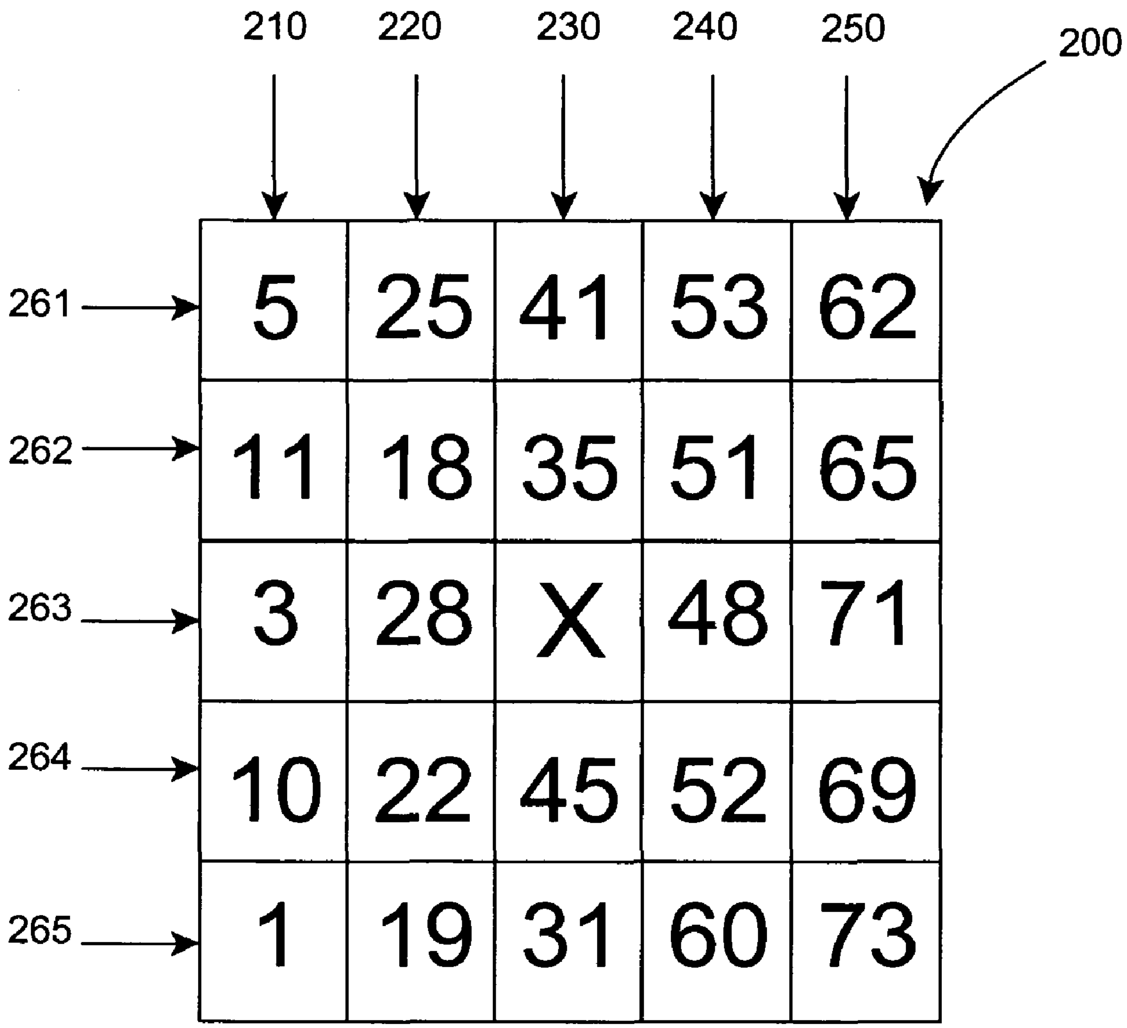
FIG. 2B is an illustration of a sample Bingo card after generation.

Player Bingo card generation consists of forming a player Bingo card 200 as depicted in FIGS. 2A and 2B from a Bingo card template. Each player Bingo card 200 consists of a matrix of coordinate locations. While the Bingo card template could take any shape, the Bingo card template is optionally organized into a square or rectangular array with rows 261-265 and columns 210, 220, 230, 240, 250 of coordinate locations. Optionally, the Bingo card template is a conventional 5×5 matrix, although it could take any shape or size. For purposes of example, the description herein is directed to a 5×5 matrix in which coordinate locations are referred to by (row, column) notation, so that position (2, 3) corresponds to coordinate location at the intersection of the second row 262 and the third column 230. For example, in FIG. 2B, the coordinate location (2, 3) includes the value "35." In a Bingo implementation as is known in the art, the center coordinate location, location (3, 3), is typically preset to be a "Free" coordinate location, meaning that it is preselected in all Bingo games. In alternate optional embodiments, this need not be the case.

Player Bingo card generation includes placing of Bingo indicia in all coordinate locations (with the possible exception of the (3, 3) location which, as noted above, may be designated a "Free" coordinate location). In the optional embodiment illustrated, such placement of Bingo indicia is accomplished by a random process. In alternate optional embodiments, such placement may be performed by player selection, or the player may be given the option of manual or automatic selection, or even partial manual and partial automatic selection. For example, in one optional embodiment, the device may include an input device through which the player can input selections of Bingo indicia from the universe of Bingo indicia for inclusion in one or more Bingo cards.

Whether the player Bingo cards are generated manually, automatically, or a combination of manually and automatically, Bingo indicia included on a player Bingo card are selected from a universe of Bingo indicia. In an optional embodiment, the universe of Bingo indicia is a closed set, such as the numbers one through seventy-five, inclusive. In a further optional embodiment, the Bingo indicia selected for each column of a player Bingo card may be further constrained to a particular range of numbers permitted in each column 210, 220, 230, 240, 250. For example, in an embodiment based on conventional Bingo, the numbers one through fifteen may be limited to the first column 210, also optionally designated as the "B" column. The numbers sixteen through thirty may be limited to the second column 220, also optionally designated as the "I" column. The numbers thirty-one through forty-five may be limited to the third column 230, also optionally designated as the "N" column. The numbers forty-six through sixty may be limited to the fourth column 240, also optionally designated as the "G" column. The numbers sixty-one through seventy-five may be limited to the fifth column 250, also optionally designated as the "O" column. In the game of Bingo as it is known in the art, there are no row restrictions imposed upon placement of Bingo numbers and, in an optional embodiment, this may hold true for the player Bingo cards generated according to the present invention.

In the optional embodiment illustrated, player Bingo card generation includes selection of twenty-four Bingo indicia, as the (3, 3) coordinate location is preset as a free space. As the example illustrated is based on a conventional Bingo card, for coordinate locations (1, 1) through (5, 1), random selection is made from Bingo numbers one through fifteen; for coordinate locations (1, 2) through (5, 2), random selection is made from Bingo numbers sixteen through thirty; and so forth as described above. While the coordinate locations on the player Bingo card could be filled sequentially or all at once, it is also contemplated that the coordinate locations could be filled in a random pattern or, at least, displayed as filling in a random pattern.

In the optional embodiment illustrated, this selection process occurs for each player Bingo card. In an alternate optional embodiment, selection may be performed for the maximum cards permitted, and then when cards are activated for play, they may be drawn from the pool of cards already selected. Optionally, card selection is limited in that no two player Bingo cards being played on the same device at the same time may be identical, i.e. have duplicated selections at all coordinate locations.

As alluded to above, in an optional embodiment, the player may opt to generate a different set of player Bingo cards prior to the commencement of any round of play. In such an optional embodiment, the player may also have the option to use the same set of player Bingo cards used in a preceding game. For example, the default setting may include the player using the generated player Bingo cards, or if the player had played a prior game, player Bingo cards from a preceding game. In such an optional embodiment, if the player opts to use different player Bingo cards, the player may press a Generate control 430 to prompt regeneration of the player Bingo cards. While regeneration could take many different forms, in an optional embodiment, the Bingo indicia on the player Bingo cards is re-selected and/or repositioned when a regeneration is triggered.

The player may also be given some input into the constitution of the player Bingo cards. For example, in one optional embodiment, the player may be permitted manual control over a portion or all the Bingo indicia included on one or more of the player Bingo cards by actuating a Select control 432. In one example of such an optional embodiment, manual generation of player Bingo cards 200 is performed by the player by specifying the Bingo indicia and their placement on a player Bingo card as shown in a card selection display 140. It is contemplated that in alternate embodiments, manual generation of player Bingo cards by a player may be allowed for a single player Bingo card, a subset of player Bingo cards, and all the player Bingo cards, and that any player Bingo cards that are not manually generated may be generated for the player. It is also contemplated that the player may be allowed to select Bingo indicia for a portion of the player Bingo card or for the entire player Bingo card and that those coordinate locations not manually selected may be generated for the player.

In an alternate optional embodiment, "equivalent" player Bingo cards may also be prohibited, where equivalent Bingo cards are Bingo cards which yield the same results in reaction to the same game events. In the game of Bingo as is known in the art, this means cards which are "y-symmetric," i.e. top-to-bottom images of each other, so that the selection at coordinate location (a, b) on one card appears at coordinate location (5−a, b) on the other card. The number of possible Bingo cards may be computed as ${}_{15}P_5{}^4 \times {}_{15}P_4$ (accounting for the preset "Free" coordinate location at location (3,3)), which yields a number on the order of $5.5\times10^{26}$ as the number of possible player Bingo cards that could be generated without duplicates or equivalents.

Once player Bingo cards 200 have been generated, play may commence. Play consists of creation of a selection set 290 of predetermined size, where each element of the selection set 290 consists of a pair 291 of values randomly selected by the device. In the optional embodiment illustrated, a set of sixteen pairs are selected, but in alternate optional embodiments may be higher or lower. Each pair 291 selected consists of a Bingo indicium and a playing card. In an optional embodiment, the Bingo indicium and playing card are separately and independently selected. In other words, in such an optional embodiment, a Bingo indicium is randomly selected and a playing card is randomly selected, with the selection of the Bingo indicium having no relation to the selection of the playing card other than being paired after each is randomly selected.

Optionally, selections are made without replacement from both the universe of Bingo numbers and the universe of playing cards, so that neither the Bingo indicium nor the playing card may repeat in a selection set 290. An example of such a selection set 290 is illustrated in FIG. 2D.

Each pair 291 consists of a Bingo indicium and a playing card. The Bingo indicium of each pair in the selection set is compared to the player Bingo cards generated. If the Bingo indicium from the selected pair it is found, i.e. if the selected Bingo indicium matches a Bingo indicium on a player Bingo card, the match is noted and, in an optional embodiment, the matching Bingo indicium on the player Bingo card is replaced by the playing card from the pair. Such comparison and replacement is performed for each player Bingo card 200, for each Bingo number of each pair 291 of the selection set 290. For example, using the example selection set 290 of FIG. 2D and the example player Bingo card 200 of FIG. 2B, the results of this comparison and replacement is illustrated by the transformation of the player Bingo card 200 in FIG. 2B into that shown in FIG. 2C. In the optional embodiment illustrated, the playing card is displayed upon the user display 100 to show the player the progress of the game. In the optional embodiment illustrated, each pair 291 within the selection set 290 is processed as selected, and the user display 100 updated. In an alternate optional embodiment, processing of pairs 291 in the selection set may be deferred until completion of the selection process.

Figure 2C:
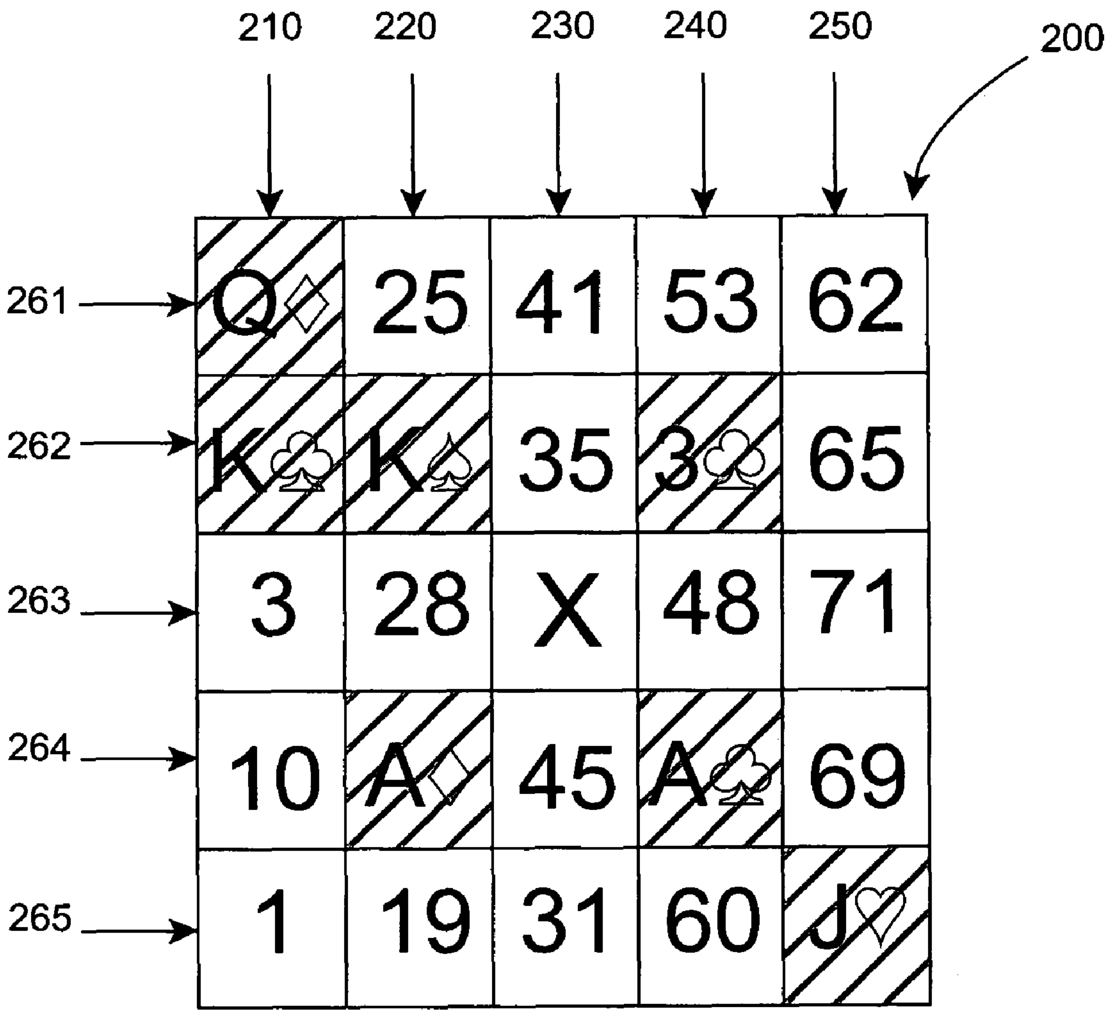
FIG. 2C is an illustration of a sample Bingo card after random selection.

In the optional embodiment illustrated, in addition to transforming the selection set of Bingo indicia matching Bingo indicia on the player Bingo cards into playing cards, the display may also highlight coordinate locations that have been matched to make than easier to visually locate, as indicated by the change in background in FIG. 2C. Such change may consist of a change of color, a change of background, a dynamic change of color, e.g. by blinking or flashing, or any such alteration of display characteristics as may make such card images easier for the player to detect. In the optional embodiment illustrated, this change in attributes is visible in the primary Bingo card display 110 and the winning Bingo card display shown in FIG. 1 as well as the multi-card display 300 illustrated in FIG. 3.

Following comparison of the pairs 291 within the selection set 290 to the player Bingo cards, each player Bingo card 200 is evaluation for potential awards. Optionally, such analysis is performed utilizing a Bingo pay table identifying winning Bingo patterns of coordinate indicia and associated awards and a poker pay table identifying winning poker hands of playing cards and associated awards. The Bingo pay table may include many different Bingo patterns, although in an optional embodiment, the conventional patterns of one or more of the columns, rows, diagonals, and/or four corners of the player Bingo card, may be designated as winning Bingo patterns Similarly, the poker pay table may include many different poker hands, although in an optional embodiment, the conventional poker hands of royal flush, straight flush, four of a kind, and so forth, may be designated as winning poker hands. One example of a combined Bingo pay table/poker pay table is illustrated in Table 1.

TABLE 1

| Result | Pay out per unit wager |
|---|---|
| Royal Flush | 1000 |
| Five-of-a-Kind | 500 |
| Straight Flush | 250 |
| Royal Flush w/Joker | 50 |
| Four-of-a-Kind | 25 |
| Full House | 10 |
| Five Card Flush | 8 |
| Five Card Straight | 4 |
| Three-of-a-Kind | 3 |
| Two-Pair | 2 |
| Pair of Kings or Aces | 1 |
| Bingo | 30 |

In evaluating poker hands, the playing cards lying along a poker pattern of coordinate locations are evaluated. While the poker patterns used in the examples of FIGS. 2A-2D are rows, columns, and diagonals, any poker pattern could be used. In fact, poker patterns need not include any particular quantity of coordinate locations or have any particular relationship (such as contiguity). In this regard, it the poker pattern of coordinate locations may take any form, including a scatter form in which the highest hand that can be formed from the playing cards appearing in the matrix may be evaluated as a poker hand. This may be particularly applied when, for example, the matrix is not square or has fewer than five coordinate locations in one or more dimensions.

Moreover, it is noted that in an optional embodiment, a pattern of coordinates may not necessarily be completely filled to be evaluated as a poker hand. For example, in one optional embodiment, if the first column only includes three playing cards, it may still be evaluated as a poker hand and may be considered a winning poker hand if, for example, the three playing cards are of the same rank and, therefore, form a three of a kind.

As noted, while any pattern of coordinate locations could be included as a poker pattern of coordinate locations, in the optional embodiment illustrated in the figures, each row, column, and diagonal combination of each player Bingo card 200 is analyzed for poker hand and Bingo marking, considering only coordinate locations into which playing cards have been inserted as a result of a Bingo number match to an pair 291 within the selection set 290, and any automatic value placements, such as, in the optional embodiment illustrated, the "free" location in coordinate location (3, 3) of each card, which may be treated as a wild card (and designated with a Joker) in the evaluation of poker hands. Thus, for example, in FIG. 2C, the A♢ in coordinate location (4, 2) along with the 3♧ in location (2, 4) and the Joker in the "free" in location (3, 3), would together form a hand of a pair of Aces. In the optional embodiment of Table 1, such a poker hand would be paid at 1-to-1.

The player Bingo card 200 shown in the example of FIG. 2C, evaluated according to the pay table shown in Table 1, includes a winning pattern by filling all five locations (more accurately four locations plus the "free" space) along one diagonal. The player Bingo card in the example of FIG. 2C also yields a straight along the same diagonal, Joker J♤ Q♢ K♧A♧, a pair of aces along the opposite diagonal, 3♧ Joker A♢, a pair of aces along fourth row, A♢ A♧, and a pair of kings along the second row, K♧ K♧ 3♧. While other rows, columns, and the four corners yield additional results, such as the first column which includes a king-high, Q♢ K♧, or the fourth column which includes an ace-high, 3♧ A♧, these are not considered a winning poker hands according to the example pay table of Table 1. Thus, the player Bingo card of FIG. 2C may be summarized as in Table 2:

TABLE 2

| Coordinate Locations Included | Payable Result | Potential Award |
|---|---|---|
| (1, 1) (2, 2) (3, 3) (4, 4) (5, 5) | Bingo | 30-to-1 |
| (1, 1) (2, 2) (3, 3) (4, 4) (5, 5) | Straight | 3-to-1 |
| (4, 2) (3, 3) (2, 4) | Pair of Aces | 1-to-1 |
| (2, 4) (4, 4) | Pair of Aces | 1-to-1 |
| (2, 1) (2, 2) (2, 4) | Pair of Kings | 1-to-1 |

In one optional embodiment, the player is rewarded for each winning outcome, i.e. each winning Bingo pattern and each winning poker hand, separately for each player Bingo card. In such an optional embodiment as applied to the example of FIG. 2C, the awards for each of the winning Bingo pattern and four winning poker hands would be accumulated. In another optional embodiment, only the highest ranking poker hand for each player Bingo card is rewarded. In such an optional embodiment as applied to the example of FIG. 2C, the player would be paid 30-to-1 for his or her winning Bingo pattern and 3-to-1 for his or her winning poker hand of a straight, but the additional pay outs of 1-to-1 for the three lower ranking winning poker hands would not be paid out. In a further optional embodiment, when a player Bingo card includes both a Bingo winning pattern and a winning poker of hand of a five card straight or higher, the player's Bingo award and poker award are paid double. In such an optional embodiment as applied to FIG. 2C, the award for the player Bingo card 200 would be doubled.

In the optional embodiment illustrated, following the processing of Bingo indicium-playing card pairs 291 within the selection set 290, the player may view the entire selection set by pressing the Show Draw control 450. Additionally, the user display 100 may show one or more winning Bingo cards 130, if any player Bingo cards 200 received an award. In one optional embodiment, a player Bingo card 200 is randomly selected from the winning Bingo cards to be displayed as the winning Bingo card 130. In another optional embodiment, the player Bingo card 200 paying the highest award is displayed as the winning Bingo card 130. Optionally, statistics on total winning and number of winning Bingo cards may optionally be displayed in the message and instructions section 150 of the user display 100.

Figure 3:
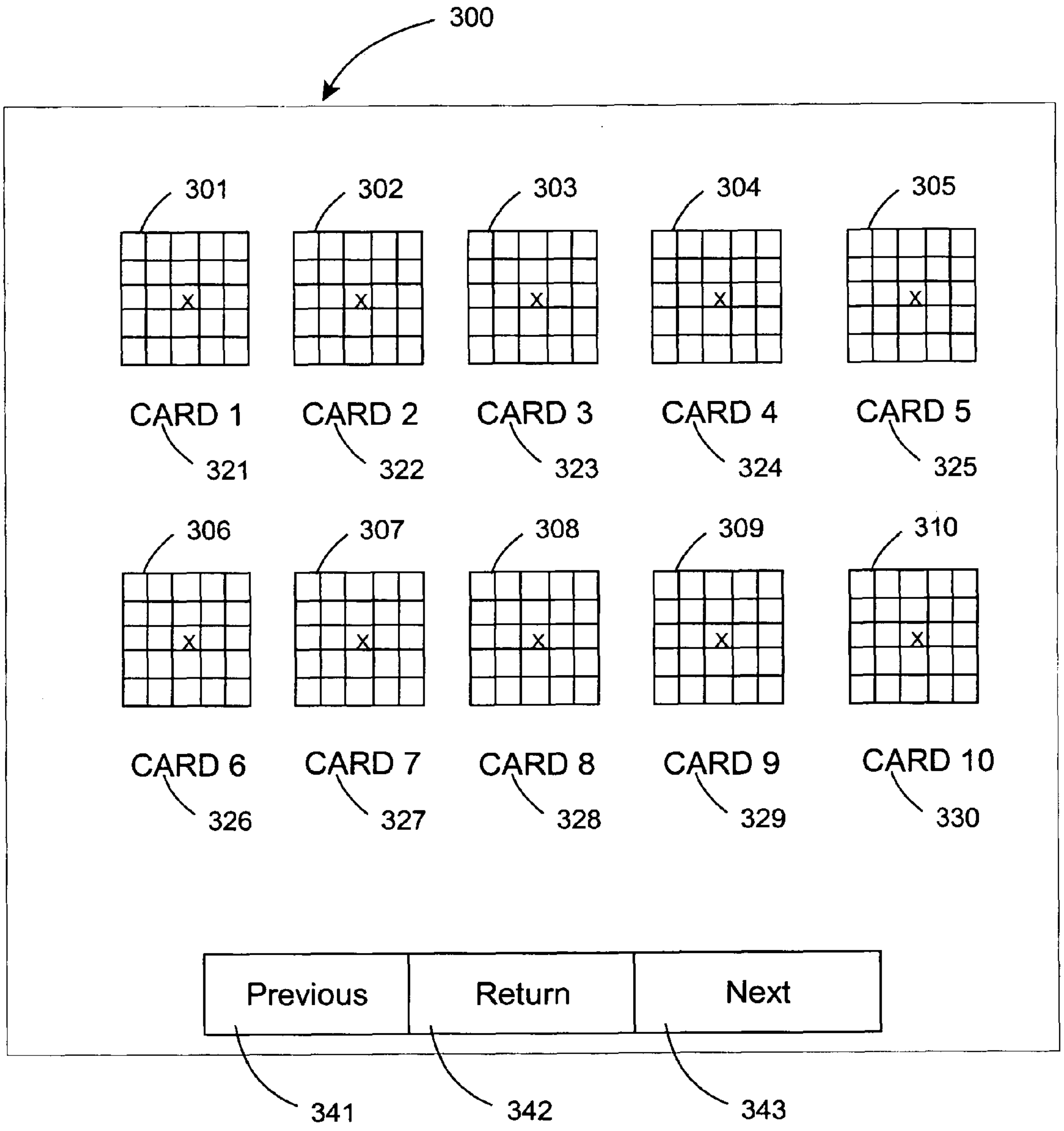
FIG. 3 is an illustration of an embodiment of a multi-card display.

The total award earned for all player Bingo cards 200 may be displayed in an Award display 410 following computation. Optionally, a player may examine the individual player Bingo cards 200 to see what contributed to that total award 410 by pressing the Show Cards control 455. In an optional embodiment, a multi-card display 300 as shown in FIG. 3 may be used to display the various player Bingo cards 301-310 that were not displayed on the user display 100 screen. The multi-card display 300 could take many different forms. In the optional embodiment illustrated, player Bingo cards 301-310 are displayed in sets of 10, and players may display additional active cards via use of the Next control 343 and Previous control 341. In this optional embodiment, a player may return to the user display 100 by pressing the Return control 342. In the optional embodiment illustrated, in order to allow the player to more readily distinguish winning cards from non-winning cards, the card labels 321-330 may display in different colors or different display attributes. In an alternate optional embodiment, different displays may be utilized for winning and non-winning cards.

In alternate optional embodiments, awards could be paid for all qualifying holdings, and adjustments for combinations of awards could be altered or eliminated.

It is noted that in one optional embodiment, selection of pairs 291 comprising the selection set 290 is based upon the output of a randomizing event. For example, in one optional embodiment, this is accomplished by a random number generator ("RNG") that communicates with, or is incorporated into, the data processor controlling the game. In such an optional embodiment, the RNG may generate a stream of random numbers that determine the selection set generated. In an optional embodiment in which the RNG uses a seed to generate random numbers, the player may be enabled to re-select the seed. In the optional embodiment illustrated, a player may press the ReSpin-Reshuffle control 435 which will prompt a re-selection of the seed used by the RNG to generate the selection set. For example, in one optional embodiment in which the RNG seed is a timer or internal clock, such a re-selection of the seed may trigger an alteration in the internal clocking mechanism, thereby changing the output of the RNG, and hence the values selected in generation of the selection set 290.

In the optional embodiment illustrated, a player wishing to view the active pay table may do so by pressing the Pay Table control 445. In an alternate embodiment, the pay table may be displayed in external signage, or may be on the user display 100.

At the conclusion of any hand, a player may cease play. In the optional embodiment illustrated, a player wishing to redeem the remaining credits, a result of initial invested amount, less amount wagered, plus amounts awarded, by pressing a Cash Out control 440. In the optional embodiment illustrated, this may result in the printing of a credit voucher which may be redeemed by the casino. In alternate optional embodiments, this may result in an entry being created in a data structure maintained by the casino. In yet another optional embodiment, this may result in the output of cash corresponding to available credits. In yet another optional embodiment, this may create entries in a tournament, or rewards of other types.

While certain embodiments of the present invention have been shown and described it is to be understood that the present invention is subject to many modifications and changes without departing from the spirit and scope of the claims presented herein.

I claim:

1. A method for conducting a game of chance for one or more players using an electronic gaming machine including a data processor in communication with an input device, a display, and a data storage device, said data storage device storing electronic representations of playing cards, electronic representations of a set of Bingo indicia, and one or more Bingo cards having a matrix of coordinate locations thereon, the method comprising:

storing at said data storage device a parameter defining a fixed size for a selection set containing a fixed quantity of pairs wherein each pair includes a Bingo indicium selected from said set of Bingo indicia and a playing card selected from said deck of playing cards;

storing at said data storage device a Bingo pay table identifying one or more winning Bingo patterns of coordinate locations and one or more associated Bingo awards;

storing at said data storage device a poker pay table identifying one or more winning poker hands of playing cards and one or more associated poker awards;

receiving through said input device a game wager from each player to play at least one Bingo card;

said data processor generating at least one player Bingo card by selecting Bingo indicia from said set of Bingo indicia and placing said selected Bingo indicia in said coordinate locations;

displaying said Bingo card at said display;

said data processor generating said selection set of fixed size, said selection set containing said fixed quantity of pairs wherein each pair includes a Bingo indicium selected from said set of Bingo indicia and a playing card selected from said deck of playing cards;

said data processor comparing the Bingo indicium of each pair to said player Bingo card;

if the Bingo indicium of a pair matches a Bingo indicium on said player Bingo card, said data processor identifying the coordinate location of the matching Bingo indicium and positioning said playing card of said pair at the coordinate location of the matching Bingo indicium;

if the coordinate locations of the matching Bingo indicia form one of said winning Bingo pattern of coordinate locations, said data processor issuing the associated Bingo award to said player; and if the playing cards positioned along a predetermined poker pattern of coordinate locations form one of said winning poker hand of playing cards, said data processor issuing the associated poker award to said player.

2. The method of claim 1 wherein said winning Bingo patterns of coordinate locations comprise one or more of the patterns selected from a group consisting of one or more columns of coordinate locations, one or more rows of coordinate locations, one or more diagonals of coordinate locations, and the four corners of coordinate locations.

3. The method of claim 1 wherein at least one coordinate location of said Bingo card includes a free indicia that is considered a match in any pattern including said free indicia.

4. The method of claim 1 wherein said step of defining said player Bingo card includes receiving selections by said player through said input device of Bingo indicia from said set of Bingo indicia to determine the Bingo indicia displayed in the coordinate locations of said Bingo card at said display.

5. The method of claim 1 wherein said step of generating at least one player Bingo card further comprises receiving an option from said player through said input device to regenerate said player Bingo card or conduct play with a previously-generated player Bingo card, wherein if the player opts to regenerate said player Bingo card, said Bingo indicia displayed in said matrix of coordinate locations are re-selected and displayed at said display.

6. The method of claim 1 wherein at least one of said selection set of Bingo indicia and playing cards are randomly selected based on a random number generator using a selected seed, said method further comprising said player prompting through said input device the re-selection of said seed.

7. The method of claim 1 wherein each pair of said selection set includes a randomly selected Bingo indicium and a randomly selected playing card, wherein said Bingo indicium and said playing card are separately and independently selected.

8. The method of claim 1 wherein said playing cards consist of an electronic representation of a standard deck of fifty-two playing cards, and said set of Bingo indicia consists of the positive integers from one to seventy-five, inclusive.

9. The method of claim 1 wherein said winning poker hands include a five-card straight, the method further comprising increasing said Bingo award and said poker award if the player has a winning Bingo pattern and a poker hand of at least a five-card straight.

10. The method of claim 1 wherein said player may opt to play a plurality of player Bingo cards, the method further comprising:

said player specifying through said input device the quantity of player Bingo cards to be played;

receiving a game wager proportional to the quantity of player Bingo cards specified; and generating the specified quantity of player Bingo cards such that none of the player Bingo cards is duplicated.

11. A method for conducting a game of chance for one or more players using an electronic gaming machine including a data processor in communication with an input device, a display, and a data storage device, said data storage device storing electronic representations of playing cards, electronic representations of a set of Bingo indicia, and one or more Bingo cards having a matrix of coordinate locations thereon, the method comprising:

storing at said data storage device a parameter defining a fixed size for a selection set containing a fixed quantity of pairs wherein each pair includes a Bingo indicium selected from said set of Bingo indicia and a playing card selected from said deck of playing cards;

storing at said data storage device a Bingo pay table identifying one or more winning Bingo patterns of coordinate locations and one or more associated Bingo awards;

storing at said data storage device a poker pay table identifying one or more winning poker hands of playing cards and one or more associated poker awards;

said data processor assigning to each player at least one Bingo card;

said data processor generating at least one player Bingo card by selecting Bingo indicia from said set of Bingo indicia and placing said selected Bingo indicia in said coordinate locations;

displaying said Bingo card at said display;

said data processor generating said selection set of fixed size, said selection set containing said fixed quantity of pairs wherein each pair includes a Bingo indicium selected from said set of Bingo indicia and a playing card selected from said deck of playing cards;

said data processor comparing the Bingo indicium of each pair to said player Bingo card;

if the Bingo indicium of a pair matches a Bingo indicium on said player Bingo card, said data processor identifying the coordinate location of the matching Bingo indicium and positioning said playing card of said pair at the coordinate location of the matching Bingo indicium;

if the coordinate locations of the matching Bingo indicia form one of said winning Bingo pattern of coordinate locations, said data processor issuing the associated Bingo award to said player; and if the playing cards positioned along a predetermined poker pattern of coordinate locations form one of said winning poker hand of playing cards, said data processor issuing the associated poker award to said player.

12. A method for conducting a game of chance for one or more players using an electronic gaming machine including a data processor in communication with an input device, a display, and a data storage device, said data storage device storing electronic representations of playing cards, electronic representations of a set of Bingo indicia, and one or more Bingo cards having a matrix of coordinate locations thereon, the method comprising:

storing at said data storage device a parameter defining a fixed size for a selection set containing a fixed quantity of pairs wherein each pair includes a Bingo indicium selected from said set of Bingo indicia and a playing card selected from said deck of playing cards;

storing at said data storage device a Bingo pay table identifying one or more winning Bingo patterns of coordinate locations and one or more associated Bingo awards;

storing at said data storage device a poker pay table identifying one or more winning poker hands of playing cards and one or more associated poker awards;

receiving through said input device a game wager from each player to play at least one Bingo card;

generating at least one player Bingo card by selecting Bingo indicia from said set of Bingo indicia and placing said selected Bingo indicia in said coordinate locations, wherein said selected Bingo indicia include at least one Bingo indicium selected through said input device by said player to be placed in the coordinate locations of said Bingo card and wherein said step of generating at least one player Bingo card includes receiving from said player through said input device an option to regenerate said player Bingo card or conduct play with a previously-generated Bingo card, wherein if the player opts to regenerate said player Bingo card, said Bingo indicia displayed in said matrix of coordinate locations are reselected and displayed at said display;

displaying said Bingo card at said display;

said data processor generating said selection set of fixed size, said selection set containing said fixed quantity of pairs wherein each pair includes a Bingo indicium selected from said set of Bingo indicia and a playing card selected from said deck of playing cards;

said data processor comparing the Bingo indicium of each pair to said player Bingo card;

if the Bingo indicium of a pair matches a Bingo indicium on said player Bingo card, said data processor identifying the coordinate location of the matching Bingo indicium and positioning said playing card of said pair at the coordinate location of the matching Bingo indicium;

if the coordinate locations of the matching Bingo indicia form one of said winning Bingo pattern of coordinate locations, said data processor issuing the associated Bingo award to said player; and if the playing cards positioned along a predetermined poker pattern of coordinate locations form one of said winning poker hand of playing cards, said data processor issuing the associated poker award to said player.

* * * * *